Patented Dec. 2, 1941

2,264,362

UNITED STATES PATENT OFFICE 2,264,362

GLYCOL ANTIFREEZE COOLING FLUID

Leo J. Clapsadle, Buffalo, N. Y., assignor to Carbide and Carbon Chemicals Corporation, a corporation of New York No Drawing. Application September 13, 1939, Serial No. 294,631

5 Claims. (Cl. 252—72)

The invention relates to glycol anti-freeze cooling fluids of non-foaming characteristics, and is particularly concerned with addition agents for preventing foam formation in a circulatory cooling fluid system employing a glycol as a freezing point depressant.

Conditions encountered in the cooling system of an automobile engine are conducive to the formation of foam in anti-freeze solutions containing a polyhydroxy alcohol, such as ethylene glycol, diethylene glycol, propylene glycol, or mixtures of these and other glycols. Unavoidable aeration, accompanied with a rapid rate of circulation and agitation at high temperatures, causes an entraining of air bubbles in the cooling fluid which promotes foam formation. Addition agents commonly used with anti-freeze mixtures, for the purpose of inhibiting corrosion or leakage, may further influence or induce a foaming tendency under the usual cooling system operation. Excessive foaming will result in loss of liquid through the overflow or safety-vent of the system, which obviously is undesirable, particularly in a cooling fluid of the permanent anti-freeze type containing a glycol.

It is an object of this invention to provide glycol anti-freeze cooling fluids inhibited against foam formation and the loss of liquid caused thereby from a circulatory cooling system. A further object is to provide improved foam prevention agents for glycol freezing point depressants, applicable generally in their foam retarding action with water dilutions of the glycol and in the presence of other additive materials of a foam promoting nature.

In accordance with my invention I propose to use as foam prevention agents a limited group of higher saturated, secondary, branch-chain aliphatic alcohols, in particular those containing from ten to seventeen carbon atoms in the molecule. Representative of these are secondary heptadecanol, tetradecanol, and undecanol, which have proven especially effective in retarding foam formation. Within this group there are numerous isomers which will function as intended, but it appears of importance that the molecular size and structure be limited as indicated, since higher and lower alcohols or those of normal straight-chain structure have not been satisfactory for the purpose of the invention. Secondary tetradecanol, particularly the isomer which may be termed 7-ethyl-2-methylundecanol-4, has shown an excellent foam preventive action, and coupled with other desirable properties, is a preferred compound among the many tested within the group specified. For most foam prevention purposes these alcohols will be found effective in concentrations varying from about 0.1% to 1.5% by weight of the undiluted glycol anti-freeze component.

The ability of the alcohols to reduce or prevent liquid losses by foaming appears to reside in the fact that they are surface active compounds substantially insoluble in glycol solutions. Such compounds tend to spread on the surface of a glycol water mixture and to form interfacial films at gas-liquid boundaries, which films are sufficiently mobile to prevent stabilization of air dispersions and to accelerate large air bubble formation. In this way overflow losses from recirculation of entrained air are reduced or eliminated entirely. Other desirable properties, of importance in these anti-freeze foam preventive agents, include a chemical inertness whereby there is no interference with the normal function and action of corrosion inhibitors, anti-leak materials or other additive agents usually present in anti-freeze compositions, and no attack or corrosion of the metal and rubber parts of the cooling system.

As already indicated, this invention contemplates the use of secondary tetradecanol and other higher alcohols specified in conjunction with many types and kinds of other additive agents in a glycol anti-freeze mixture. An example of this, which constitutes a specific further modification of the present disclosure, consists in the use of these alcohols in association with certain anti-leak agents. Alginate compounds and hydroxyalkyl cellulose derivatives have been proposed, and are disclosed in copending applications Serial Nos. 294,630 and 299,107, in the name of H. Lamprey, as leak preventive agents for glycol anti-freeze solutions. While these materials are excellently adapted for their anti-leak function and purpose, they may promote to a certain extent the tendency to foam, and in the presence of these compounds, it is, therefore, especially desirable to employ a foam preventive agent. The higher alcohols here disclosed are well suited for this purpose, and in the presence of alginate compounds and hydroxyalkyl cellulose derivatives, either separately or in mixture, are likewise effective in their foam preventive action. In proportions of these anti-leak agents as disclosed in the copending applications referred to, the higher secondary alcohols will serve the required function in the same concentrations above mentioned, i. e. about 0.1% to 1.5% by weight of the glycol. A specific antifreeze mixture containing all three of these additive components, which has proven by many tests to be exceptionally well inhibited against fluid loss by either direct leakage or foaming, is composed of ethylene glycol as the freezing point depressant, into which there is uniformly dispersed about 0.01% to 0.05% of sodium alginate, about 0.005% to 0.03% of hydroxyethyl cellulose, and about 0.25% to 0.8% of secondary tetradecanol, on a weight basis of the undiluted glycol. Such an anti-freeze will in use as a cooling fluid normally be diluted with from 30% to 80% of water, and in aqueous solutions the essential function of each additive ingredient is in no way affected or destroyed.

It will be obvious that many different anti-freeze mixtures may be formulated employing the compounds here disclosed as the essential foam prevention agent, and numerous modifications, in the way of other additive components of a complete anti-freeze mixture, are intended to be included within the scope of the invention, which should not be limited other than as defined in the appended claims.

I claim:

1. A cooling fluid containing a glycol as a freezing point depressant, a leakage preventive agent composed essentially of a member of the group consisting of hydroxyalkyl cellulose and an alginate, and a foam preventive agent, said latter agent being composed essentially of a saturated, secondary, branch-chain, aliphatic alcohol containing from ten to seventeen carbon atoms in the molecule, in an amount from about 0.1% to 1.5 by weight of the glycol component.

2. A cooling fluid containing a glycol as a freezing point depressant, a leakage preventive agent composed essentially of a member of the group consisting of hydroxyalkyl cellulose and an alginate, and a foam preventive agent, said latter agent being composed essentially of a member of the group consisting of secondary heptadecanol, secondary tetradecanol and secondary undecanol, in an amount from about 0.1% to 1.5% by weight of the glycol component.

3. A cooling fluid containing ethylene glycol as a freezing point depressant, a leakage preventive agent composed essentially of a mixture of hydroxyethyl cellulose and sodium alginate, and a foam preventive agent composed essentially of about 0.25% to 0.8% of secondary tetradecanol by weight of the ethylene glycol component.

4. A cooling fluid containing ethylene glycol as a freezing point depressant, a leakage preventive agent composed essentially of a mixture of about 0.005% to 0.03% hydroxyethyl cellulose and about 0.01% to 0.05% sodium alginate, and a foam preventive agent composed essentially of about 0.1% to 1.5% of a member of the group consisting of secondary heptadecanol, secondary tetradecanol and secondary undecanol, the said concentrations of all three components being by weight basis of the ethylene glycol.

5. A cooling fluid containing ethylene glycol as a freezing point depressant, a leakage preventive agent composed essentially of a mixture of about 0.005% to 0.03% hydroxyethyl cellulose and about 0.01% to 0.05% sodium alginate, and a foam preventive agent composed essentially of about 0.25% to 0.8 of secondary teradecanol, the said concentrations of all three components being by weight basis of the ethylene glycol.

LEO J. CLAPSADLE.